United States Patent
Dachs, II et al.

(10) Patent No.: US 10,611,080 B2
(45) Date of Patent: Apr. 7, 2020

(54) THREE-DIMENSIONAL PRINTING USING SELECTIVELY LOCKABLE CARRIERS

(71) Applicant: Carbon, Inc., Redwood City, CA (US)

(72) Inventors: Gregory W. Dachs, II, San Mateo, CA (US); Derek Bruce Young, San Francisco, CA (US); David Moore, San Carlos, CA (US); Edward T. Samulski, Chapel Hill, NC (US)

(73) Assignee: Carbon, Inc., Redwood City, CA (US)

( * ) Notice: Subject to any disclaimer, the term of this patent is extended or adjusted under 35 U.S.C. 154(b) by 487 days.

(21) Appl. No.: 15/365,644

(22) Filed: Nov. 30, 2016

(65) Prior Publication Data

US 2017/0173881 A1 Jun. 22, 2017

Related U.S. Application Data

(60) Provisional application No. 62/271,076, filed on Dec. 22, 2015.

(51) Int. Cl.
*B29C 64/129* (2017.01)
*B33Y 10/00* (2015.01)
(Continued)

(52) U.S. Cl.
CPC .......... *B29C 64/129* (2017.08); *B29C 64/124* (2017.08); *B29C 64/188* (2017.08); *B29C 64/245* (2017.08); *B29C 64/264* (2017.08); *B33Y 10/00* (2014.12); *B33Y 30/00* (2014.12); *B29K 2105/0058* (2013.01)

(58) Field of Classification Search
CPC ... B29C 64/124; B29C 64/129; B29C 64/223; B29C 64/245; B29C 64/25; B29C 64/255; B29C 64/307; B29C 64/379
See application file for complete search history.

(56) References Cited

U.S. PATENT DOCUMENTS 5,096,530 A * 3/1992 Cohen ............... B29C 64/40
                                                   118/506
5,122,441 A   6/1992 Lawton et al.
(Continued)

FOREIGN PATENT DOCUMENTS

WO   200172501    10/2001
WO   2011086450   7/2011

OTHER PUBLICATIONS

Dendukuri et al., Stop-flow lithography in a microfluidic device, Lab Chip, 2007, 7, 818-828, published online May 21, 2007.
(Continued)

*Primary Examiner* — Robert C Dye
*Assistant Examiner* — Taryn Trace Willett
(74) *Attorney, Agent, or Firm* — Myers Bigel, P.A.

(57) ABSTRACT

A method includes: providing a three-dimensional printer including a build surface and a carrier that is movable away from and toward the build surface; advancing the carrier toward the build surface and contacting a lower surface of the carrier with the build surface or a fixture or frame member adjacent the build surface to align the carrier in an aligned position with the lower surface of the carrier parallel to the build surface; and locking the carrier in a locked state to maintain the carrier in the aligned position.

20 Claims, 13 Drawing Sheets

(51) Int. Cl.
  *B33Y 30/00* (2015.01)
  *B29C 64/124* (2017.01)
  *B29C 64/245* (2017.01)
  *B29C 64/188* (2017.01)
  *B29C 64/264* (2017.01)
  *B29K 105/00* (2006.01)

(56) References Cited

U.S. PATENT DOCUMENTS

| | | | |
|---|---|---|---|
| 5,236,637 | A | 8/1993 | Hull |
| 5,345,391 | A * | 9/1994 | Hull ................ B29C 64/40 |
| | | | 156/273.3 |
| 5,391,072 | A | 2/1995 | Lawton et al. |
| 5,529,473 | A * | 6/1996 | Lawton ............. B29C 64/135 |
| | | | 425/174.4 |
| 7,438,846 | B2 | 10/2008 | John |
| 7,709,544 | B2 | 5/2010 | Doyle et al. |
| 7,845,930 | B2 | 12/2010 | Shkolnik et al. |
| 7,892,474 | B2 | 2/2011 | Shkolnik et al. |
| 8,110,135 | B2 | 2/2012 | El-Siblani |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,360,757 | B2 | 6/2016 | DeSimone et al. |
| 9,498,920 | B2 | 11/2016 | DeSimone et al. |
| 9,764,513 | B2 * | 9/2017 | Stampfl ................. B33Y 10/00 |
| 9,993,974 | B2 | 6/2018 | DeSimone et al. |
| 10,016,938 | B2 | 7/2018 | DeSimone et al. |
| 10,093,064 | B2 | 10/2018 | DeSimone et al. |
| 10,144,181 | B2 | 12/2018 | DeSimone et al. |
| 10,144,205 | B2 * | 12/2018 | El-Siblani ............. B33Y 10/00 |
| 10,150,253 | B2 | 12/2018 | DeSimone et al. |
| 10,232,605 | B2 * | 3/2019 | DeSimone ............. B33Y 10/00 |
| 2008/0179787 | A1 * | 7/2008 | Sperry ................. B33Y 10/00 |
| | | | 264/308 |
| 2008/0226346 | A1 * | 9/2008 | Hull .................... B29C 64/106 |
| | | | 399/177 |
| 2010/0100222 | A1 * | 4/2010 | Skubic ................. B29C 64/20 |
| | | | 700/110 |
| 2011/0089610 | A1 | 4/2011 | El-Siblani et al. |
| 2012/0328726 | A1 * | 12/2012 | Zenere ................ B29C 64/20 |
| | | | 425/174.4 |
| 2013/0292862 | A1 | 11/2013 | Joyce |
| 2013/0295212 | A1 | 11/2013 | Chen et al. |
| 2014/0052288 | A1 * | 2/2014 | El-Siblani ............ G05B 19/042 |
| | | | 700/119 |
| 2015/0064298 | A1 * | 3/2015 | Syao ..................... B29C 64/124 |
| | | | 425/169 |
| 2015/0151489 | A1 * | 6/2015 | Elsey ................... B29C 35/0805 |
| | | | 264/401 |
| 2015/0331402 | A1 | 11/2015 | Lin et al. |
| 2015/0360419 | A1 | 12/2015 | Willis et al. |
| 2016/0303795 | A1 * | 10/2016 | Liu ..................... B29C 67/0085 |
| 2017/0100897 | A1 * | 4/2017 | Chen .................... B33Y 30/00 |
| 2017/0129167 | A1 | 5/2017 | Castanon |
| 2017/0129169 | A1 | 5/2017 | Batchelder et al. |

OTHER PUBLICATIONS

Dendurkuri et al., Continuous-flow lithography for high-throughput microparticle synthesis, Nature Materials, vol. 5, pp. 365-369, May 2006, published online Apr. 9, 2006.
Dendurkuri et al., Modeling of Oxygen-Inhibited Free Radical Photopolymerization in PDMS Microfluidic Device, Macromolecules, 2008, 41 (22), 8547-8556, published Oct. 21, 2008.
J. Tumbleston et al., Continuous liquid interface production of 3d objects, Science 347, 1349-1352 (published online Mar. 16, 2015).
Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.
Stern, S.A., The 'Barrer' Permeability Unit, pp. 1933-1934 (1968) Journal of Polymer Science, Part A-2, vol. 6.
Y. Pan et al., J. Manufacturing Sci. and Eng. 134, 051011-1 (Oct. 2012).
Yasuda et al., Permeability of Polymer Membranes to Dissolved Oxygen, pp. 1314-1316 (1966) Journal of Polymer Science, vol. 4.

* cited by examiner

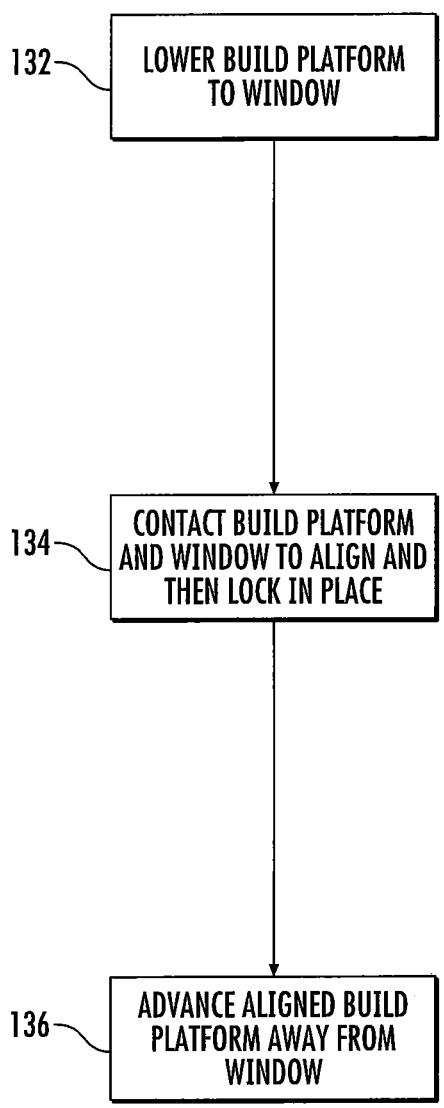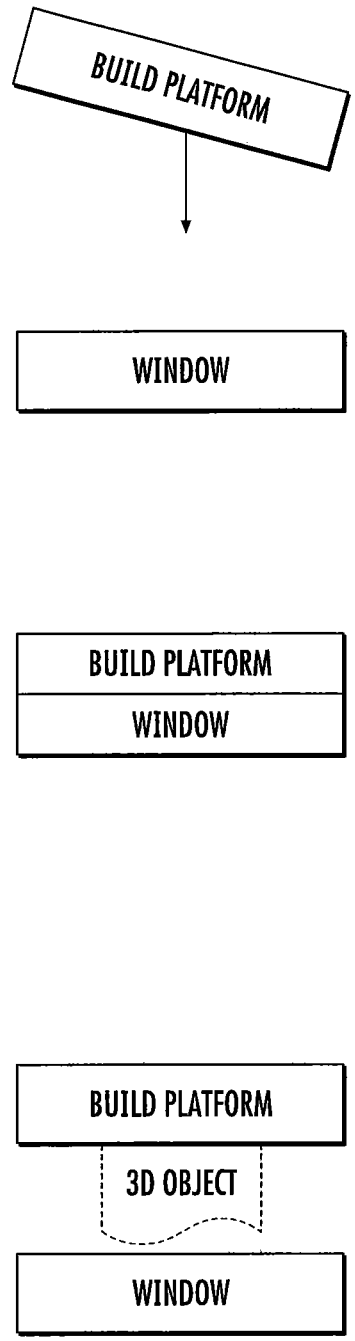
FIG. 6A
FIG. 6B

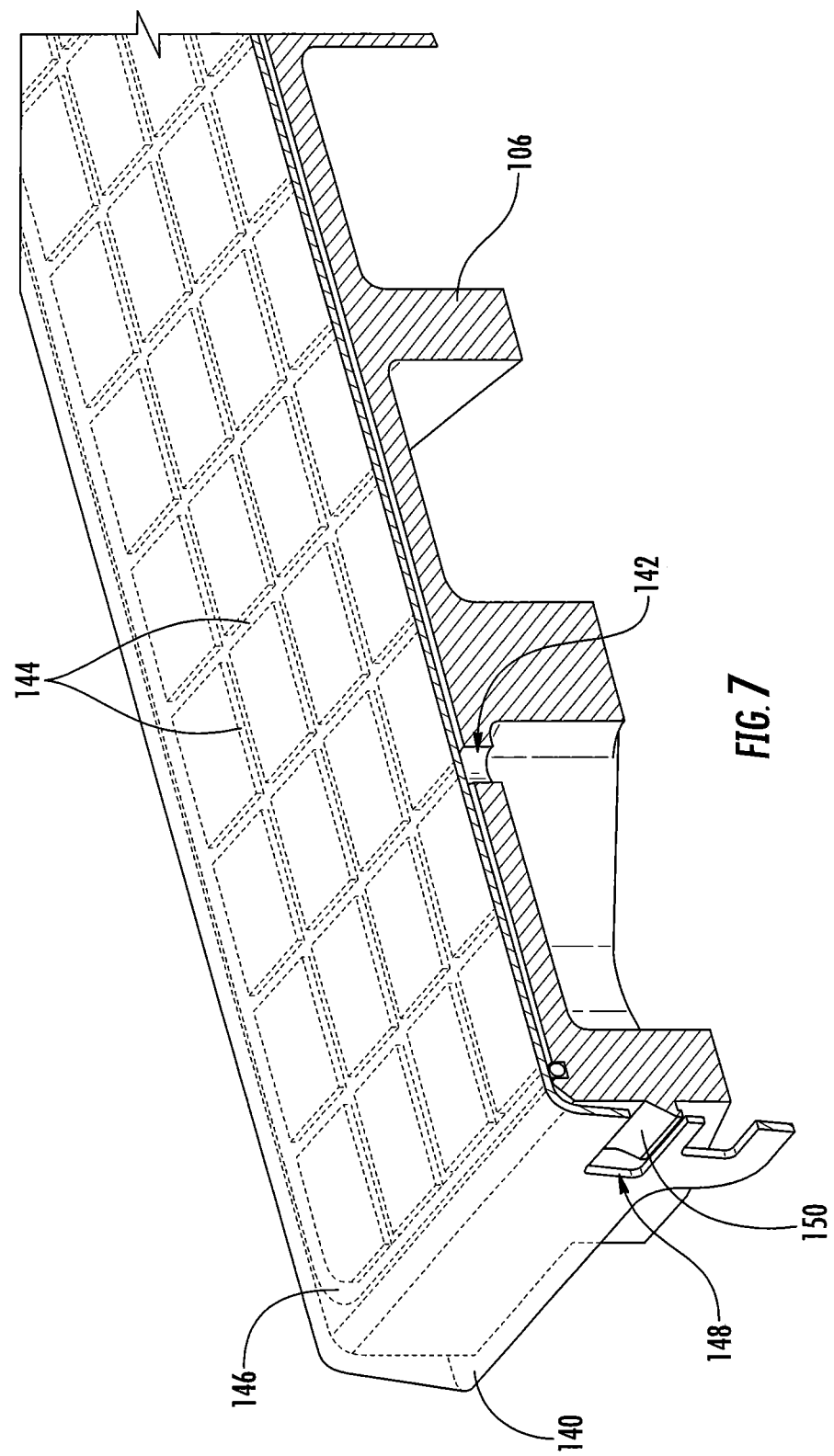

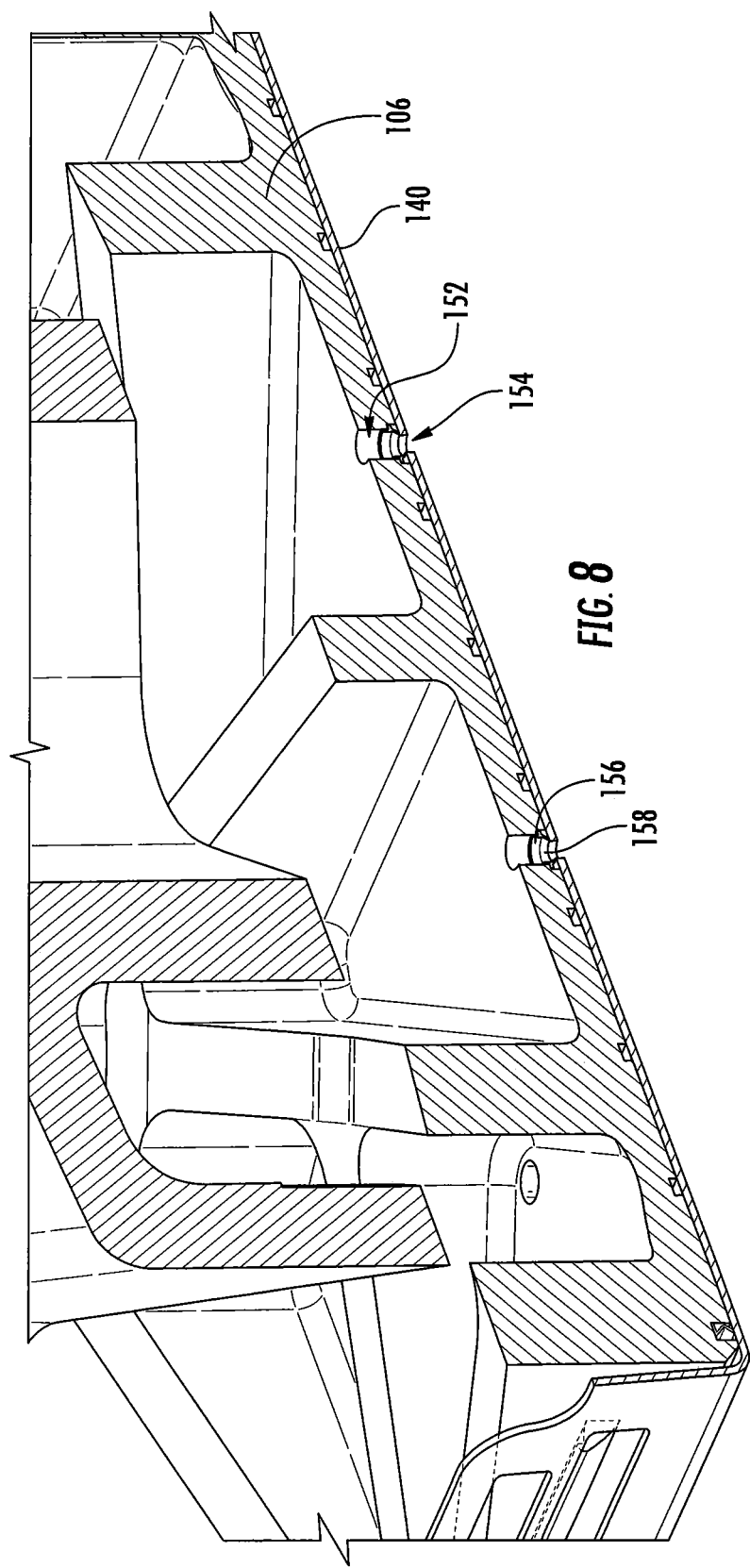

THREE-DIMENSIONAL PRINTING USING SELECTIVELY LOCKABLE CARRIERS

RELATED APPLICATIONS

This application claims priority from U.S. Provisional Application No. 62/271,076, filed Dec. 22, 2015, the disclosure of which is hereby incorporated herein in its entirety.

BACKGROUND

Some three-dimensional printers include a build platform or carrier and a build surface defined by a window. Liquid resin is fed to a build region between the carrier and the build surface and irradiated through the window to form a solid polymer from the liquid resin. The carrier is advanced away from the build surface to form a three-dimensional object from the solid polymer.

It is important that the carrier and the window are properly aligned (e.g., the lower surface of the carrier should be parallel to the upper surface of the window). One solution is to use high precision fasteners to connect the carrier to mating features on the printer. However, this solution may not be acceptable for long-term use. For example, the carrier and/or the printer could be dropped or jolted such that the carrier loses alignment.

It would be desirable for the printer to automatically align the carrier (or for the end user to be able to easily align the carrier), for example on a per-print basis.

SUMMARY

Some embodiments of the present invention are directed to a method including: providing a three-dimensional printer comprising a build surface and a carrier that is movable away from and toward the build surface; advancing the carrier toward the build surface and contacting a lower surface of the carrier with the build surface to align the carrier in an aligned position with the lower surface of the carrier parallel to the build surface; and locking the carrier in a locked state to maintain the carrier in the aligned position.

Some other embodiments of the present invention are directed to a three-dimensional printer including a build surface, a carrier that is movable away from and toward the build surface and a plurality of locking mechanisms on the carrier. The plurality of locking mechanisms are configured to be selectively unlocked so that the carrier is in an unlocked state in which the carrier can rotate in pitch and roll, and the plurality of locking mechanisms are also configured to be selectively locked so that the carrier is in a locked state in which the carrier is aligned with the build surface with a lower surface of the carrier parallel to the build surface.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 6A and 6B are a flowchart and a schematic illustration, respectively, that illustrate operations of the invention according to some embodiments.

FIG. 7 is a fragmentary perspective view of a build layer member of the carrier assembly of FIG. 2.

FIG. 8 is a fragmentary perspective view of a build platform and the build layer member of the carrier assembly of FIG. 2.

DETAILED DESCRIPTION

Figure 1:
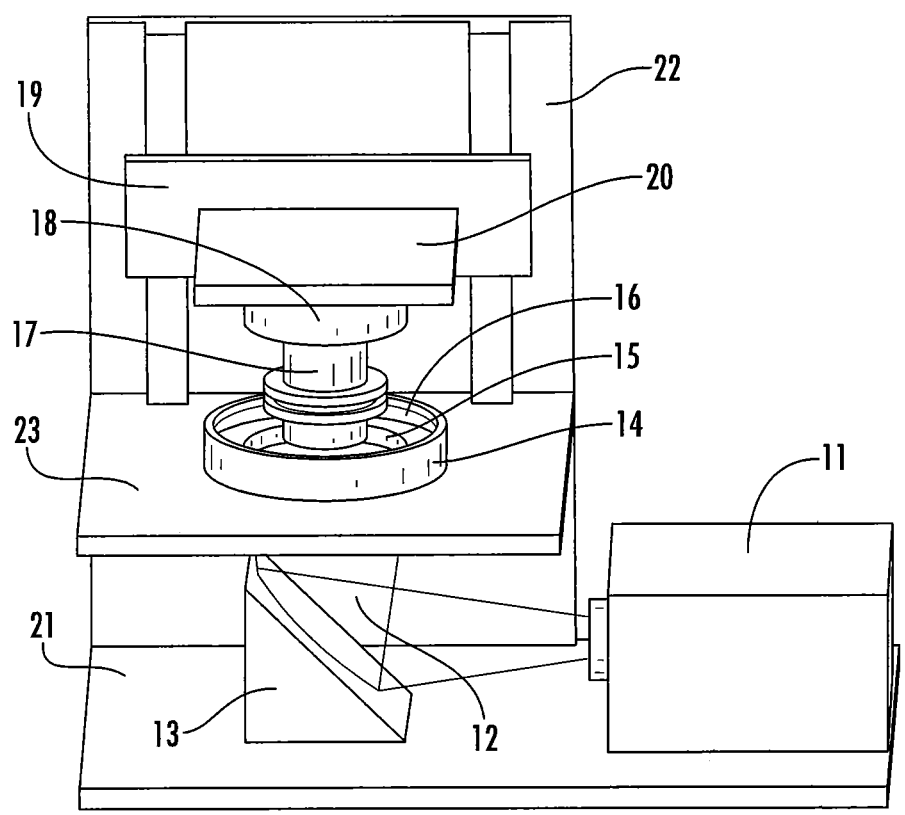
FIG. 1 is perspective view of one embodiment of an apparatus of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to One embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A simplified example of an apparatus incorporating the present invention is shown in FIG. 1. It comprises a radiation source 11 such as a digital light processor (DLP) providing electromagnetic radiation 12 which though reflective mirror 13 illuminates a build chamber defined by wall 14 and a build plate surface or window 15 forming the bottom of the build chamber, which build chamber is filled with liquid resin 16. The top of the object under construction 17 is attached to a carrier 18. The carrier is driven in the vertical direction by linear stage 19.

As shown in FIG. 1, the various components are mounted on a support or frame assembly 20. While the particular design of the support or frame assembly is not critical and can assume numerous configurations, in the illustrated embodiment it is comprised of a base 21 to which the radiation source 11 is securely or rigidly attached, a vertical member 22 to which the linear stage is operatively associated, and a horizontal table 23 to which wall 14 is removably or securely attached (or on which the wall is placed), and with the build plate rigidly fixed, either permanently or removably, to form the build chamber as described above.

The apparatus can be further configured and can carry out methods as described in U.S. Patent Application Publication No. 2015/0072293 to DeSimone et al., the disclosure of which is hereby incorporated herein in its entirety.

The three dimensional intermediate is preferably formed from resins as described above by additive manufacturing, typically bottom-up or top-down additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce and 2013/0295212 to Chen et al., and PCT Application Publication No. WO 2015/164234 to Robeson et al. The disclosures of these patents and applications are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid optionally comprising a mixture of (i) a light (typically ultraviolet light) polymerizable liquid first component, and (ii) a second solidifiable component of the dual cure system; and then (c) irradiating the build region with light to form a solid polymer, e.g., a solid polymer scaffold from the first component and also advancing (typically lowering) the carrier away from the build surface to form a three-dimensional object or intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three dimensional intermediate is formed, analogous to the build surface in bottom-up three dimensional fabrication as discussed below.

In general, bottom-up three dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid optionally comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional object or intermediate having the same shape as, or a shape to be imparted to, the three-dimensional object and containing said second solidifiable component (e.g., a second reactive component) carried in the scaffold in unsolidified and/or uncured form.

In some embodiments of bottom up or top down three dimensional fabrication as implemented in the context of the present invention, the build surface is stationary during the formation of the three dimensional object or intermediate; in other embodiments of bottom-up three dimensional fabrication as implemented in the context of the present invention, the build surface is tilted, slid, flexed and/or peeled, and/or otherwise translocated or released from the growing three dimensional object or intermediate, usually repeatedly, during formation of the three dimensional object or intermediate.

In some embodiments of bottom up or top down three dimensional fabrication as carried out in the context of the present invention, the polymerizable liquid (or resin) is maintained in liquid contact with both the growing three dimensional object or intermediate and the build surface during both the filling and irradiating steps, during fabrication of some of, a major portion of, or all of the three dimensional object or intermediate.

In some embodiments of bottom-up or top down three dimensional fabrication as carried out in the context of the present invention, the growing three dimensional object or intermediate is fabricated in a layerless manner (e.g., through multiple exposures or "slices" of patterned actinic radiation or light) during at least a portion of the formation of the three dimensional object or intermediate.

In some embodiments of bottom up or top down three dimensional fabrication as carried out in the context of the present invention, the growing three dimensional intermediate is fabricated in a layer-by-layer manner (e.g., through multiple exposures or "slices" of patterned actinic radiation or light), during at least a portion of the formation of the three dimensional object or intermediate.

In some embodiments of bottom up or top down three dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top down three dimensional fabrication as carried out in the context of the present invention, the growing three dimensional object or intermediate is fabricated in a layerless manner during the formation of at least one portion thereof, and that same growing three dimensional object or intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. 2015/0097316, and to publish as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). The disclosures of the aforementioned patents are hereby incorporated by reference herein in their entireties. In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. In further embodiments, gas inhibitors which are dissolved in liquids (e.g. oils or lubricants) may be employed. For example, oxygen dissolved in a fluorinated fluid. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.11, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by switching a "window" or "build surface" and associated reservoir of polymerizable liquid in the apparatus); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid funnel or liquid connector segment, covalently coupled to a flexible pipe or tube segment).

Once the three-dimensional intermediate is formed, it may be removed from the carrier, optionally washed, any supports optionally removed, any other modifications optionally made (cutting, welding, adhesively bonding, joining, grinding, drilling, etc.), and then heated and/or microwave irradiated sufficiently to further cure the resin and form the three dimensional object. Of course, additional modifications may also be made following the heating and/or microwave irradiating step.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), benzene, toluene, etc. Such wash solutions may optionally contain additional constituents such as surfactants, etc. A currently preferred wash liquid is a 50:50 (volume:volume) solution of water and isopropanol. Wash methods such as those described in U.S. Pat. No. 5,248,456 may be employed and are included therein.

After the intermediate is formed, optionally washed, etc., as described above, it is then heated and/or microwave irradiated to further cure the same. Heating may be active heating (e.g., in an oven, such as an electric, gas, or solar oven), or passive heating (e.g., at ambient temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at least a first temperature and a second temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first oven temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final oven temperature of 250 or 300° C., at a change in heating rate of 0.5° C. per minute, to 5° C. per minute. (See, e.g., U.S. Pat. No. 4,785,075).

It will be clear to those skilled in the art that the materials described in the current invention will be useful in other additive manufacturing techniques, including ink-jet printer-based methods.

Figure 2:
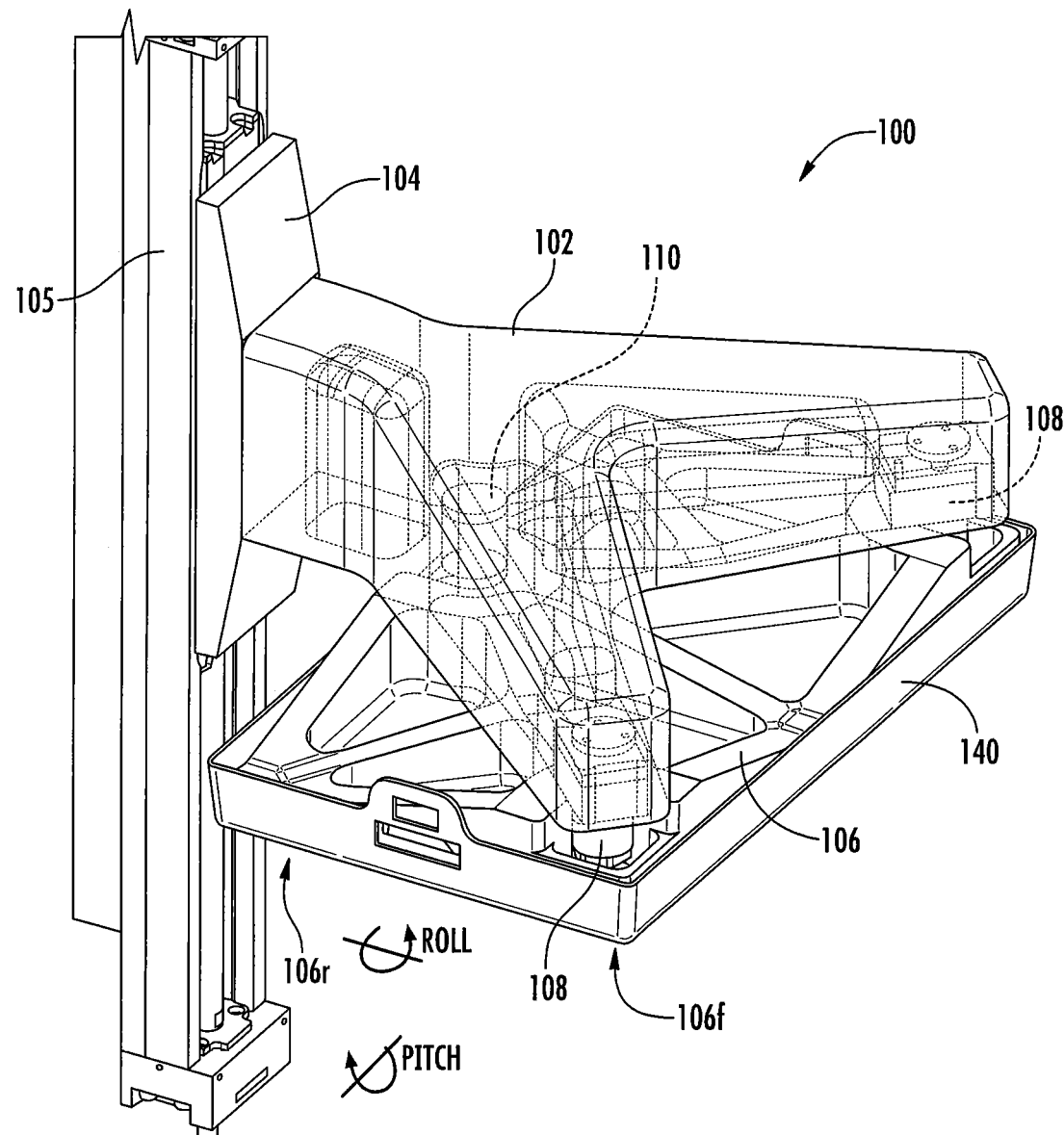
FIG. 2 is a partially transparent perspective view of a carrier assembly according to some embodiments.

Referring now to FIG. 2, a build platform assembly or carrier assembly 100 according to some embodiments is illustrated. The build platform assembly 100 can be used in place of the carrier 18 of FIG. 1. The assembly 100 includes an upper support 102 that is integrated with or configured to couple to a linear stage 104. The linear stage 104 is configured to move the build platform assembly 100 up and down (e.g., in the Z direction along track 105).

The build platform assembly 100 also includes a lower platform 106 (also referred to herein as the build platform). Between the upper support 102 and the lower platform 106 are a plurality of lock or locking mechanisms 108. As illustrated, there are two lock mechanisms 108 at a front portion 106f of the lower platform 106. Also between the upper support 102 and the lower platform 106 is a flexure member 110 at a rear portion 106r of the lower platform 106. According to some embodiments, the lock mechanisms 108 and/or the flexure 110 couple the upper support 102 and the lower platform 106.

The lock mechanisms 108 are configured to be selectively locked and unlocked. The lock mechanisms 108 also allow for axial travel (e.g., in the Z direction) when the lock mechanisms 108 are in the unlocked state. In the unlocked state, the combined motion of the multiple lock mechanisms 108 allow the lower platform 106 to move in pitch and roll. The flexure 110 is configured to be compliant in pitch and roll and stiff in Cartesian directions. The lower platform 106 is locked in place when the lock mechanisms 108 are in a locked position or state.

Figure 3:
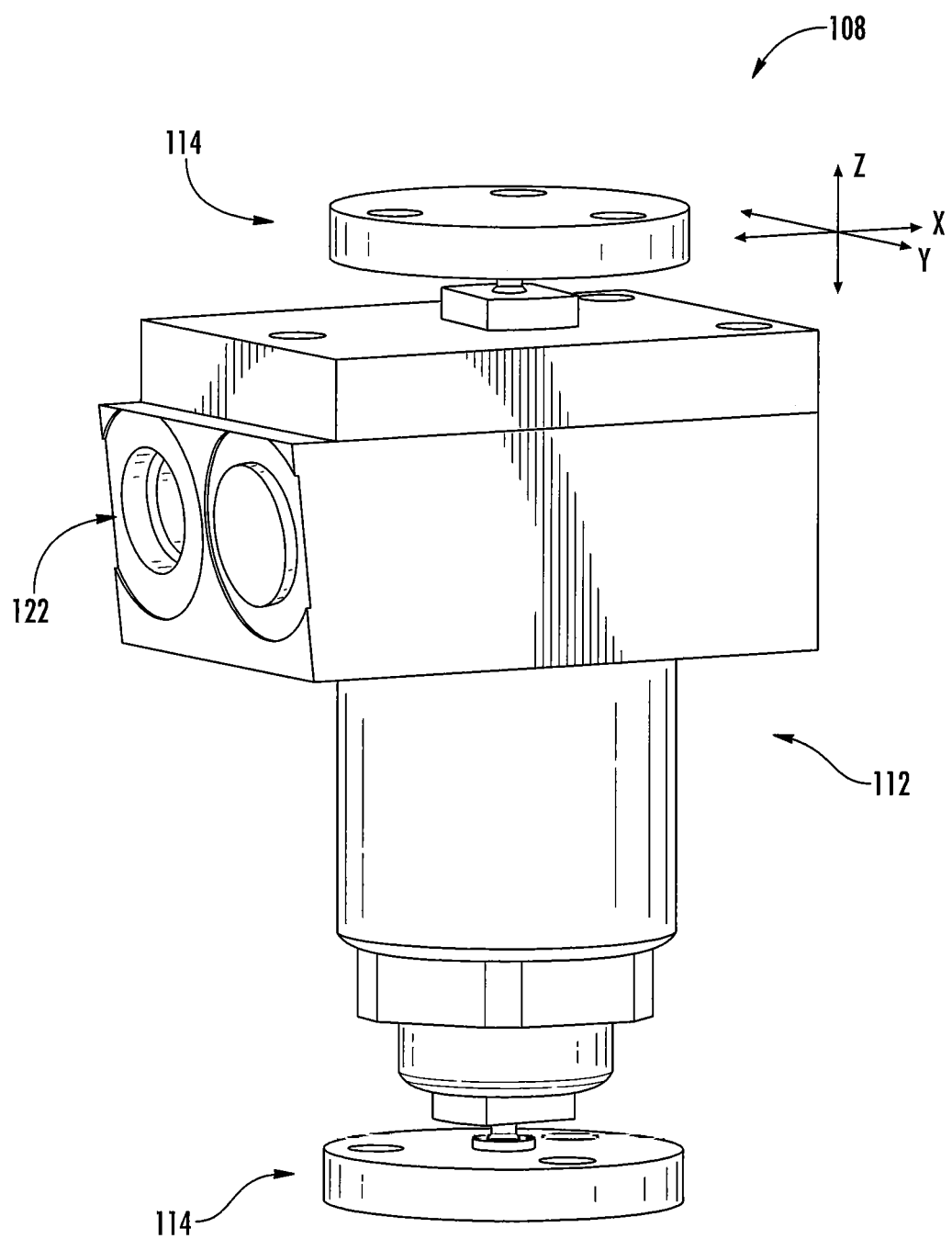
FIG. 3 is a perspective view of a locking mechanism of the carrier assembly of FIG. 2.
Figure 4:
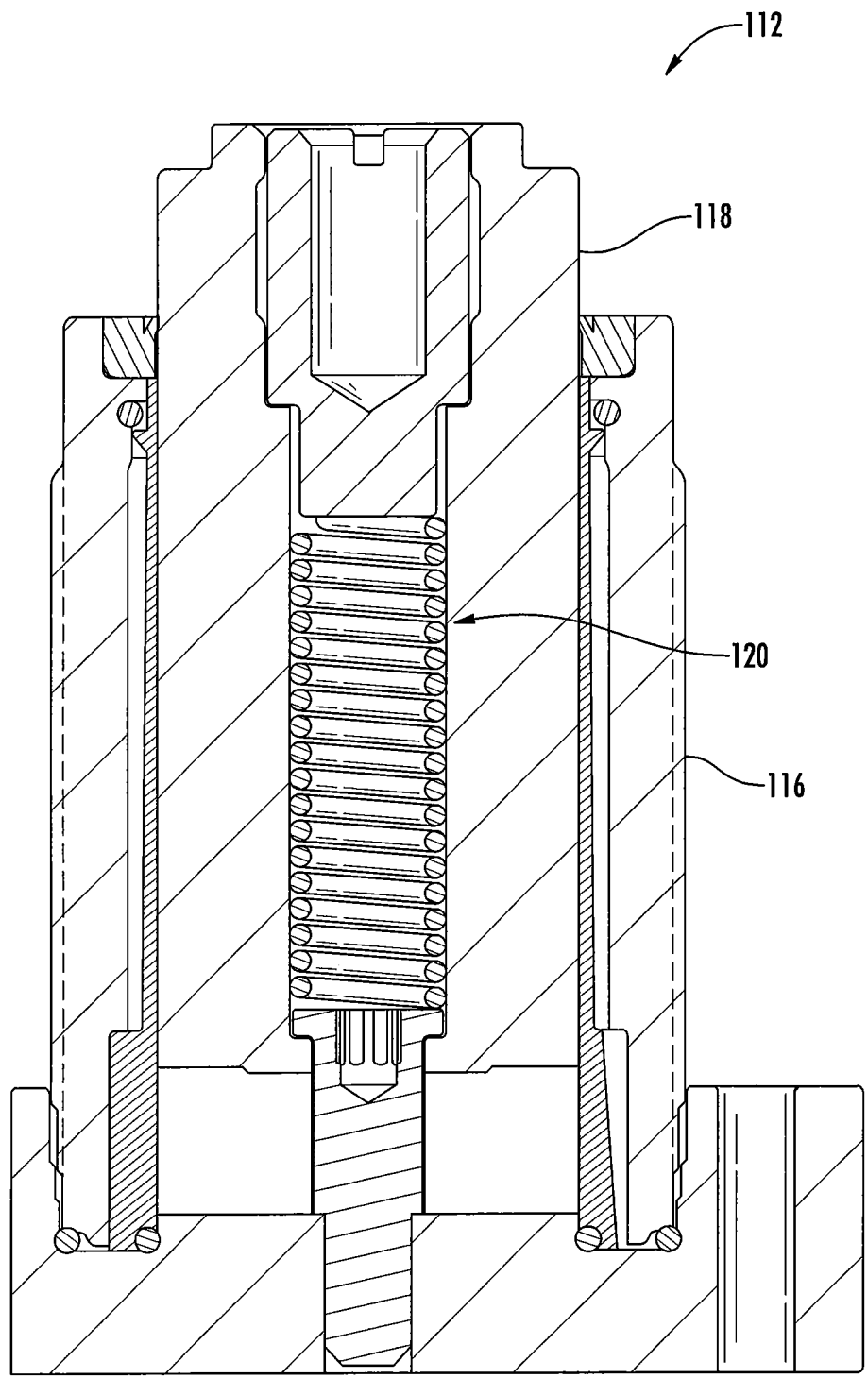
FIG. 4 is a sectional view of a hydraulic work support of the locking mechanism of FIG. 3.

One of the lock mechanisms 108 is shown in greater detail in FIGS. 3 and 4. The lock mechanism 108 includes a work support member 112 and a flexure member 114 on each opposite end of the of the work support 112. The flexures 114 are configured to have relatively low stiffness in the X and Y directions and relatively high stiffness in the Z direction.

The work support 112 is configured to be pressurized to selectively lock the lock mechanism 108. The work support 112 includes a body 116 and a piston 118. The work support 112 also includes a spring 120 that is configured to push the piston 118 outwardly away from the body 116 when the work support 112 is not pressurized (e.g., when the lock mechanism 108 is in the unlocked state). That is, the work support 112 allows axial motion of the piston 118 within the body 116 in the unlocked state.

The work support 112 may be pressurized using, for example, hydraulic pressure communicated through tubing that is connected to a port 122. The work support 112 locks stiffly when the pressure is applied. An exemplary suitable work support is a Spring Applied Hydraulic Work Support available from Vektek in Emporia, Kans.

Figure 5:
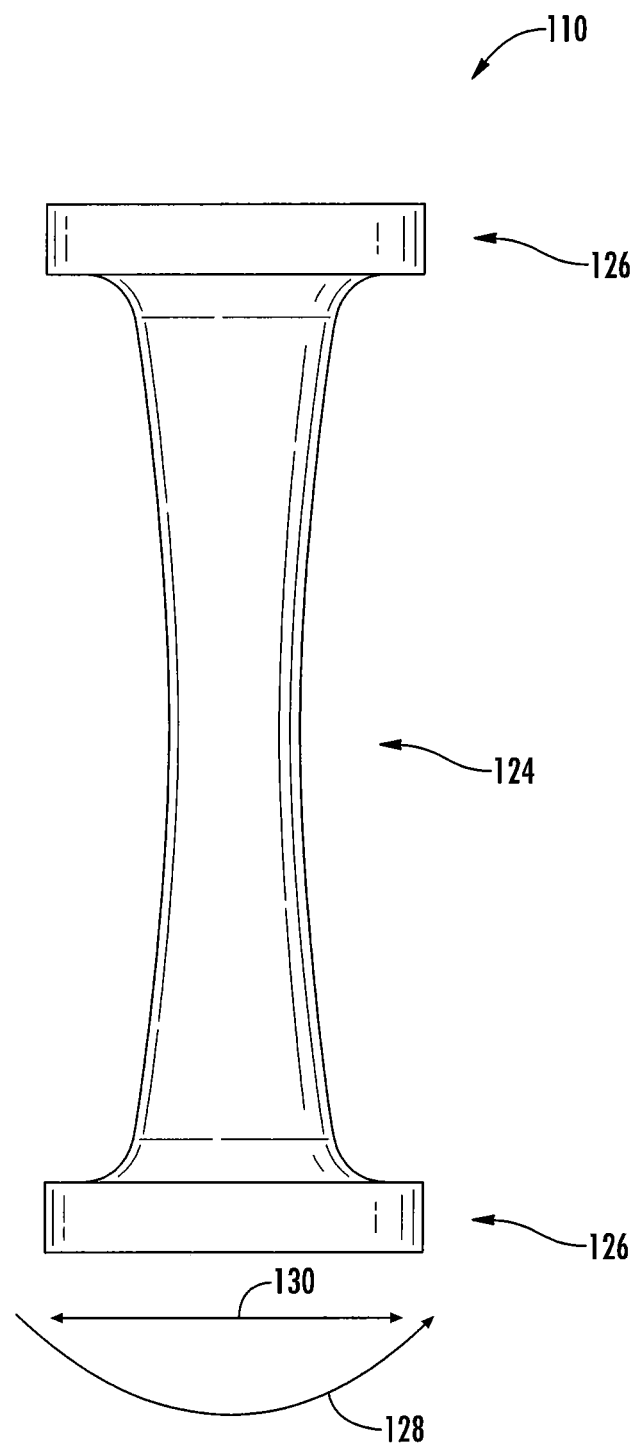
FIG. 5 is a front view of a flexure of the carrier assembly of FIG. 2.

The flexure 110 is shown in greater detail in FIG. 5. The flexure 110 includes a necked middle section 124 between two end portions 126. The necked middle section 124 allows compliance in bending (arrow 128) while minimizing impact to axial stiffness. The flexure 110 also maintains stiffness in Cartesian directions (arrow 130).

As described above, the build platform 106 is selectively lockable and unlockable. In the unlocked state, the build platform 106 can move in pitch and roll. In the unlocked state, the build platform 106 is constrained from moving in the axial direction by the flexure 124 which is stiff in the axial direction. In the locked state, the build platform 106 is locked in position (e.g., the build platform 106 cannot move in pitch and roll and cannot move independently in the axial direction).

This arrangement facilitates alignment of the build platform 106. FIG. 6A is a flowchart illustrating an alignment operation according to some embodiments and FIG. 6B schematically illustrates the alignment operation. The build platform 106 is first lowered toward the window in the unlocked state (Block 132) so that the build platform 106 is "floating." As illustrated in FIG. 6B, the build platform 106 may not be aligned with the window as it is lowered.

The build platform 106 is brought into contact with the window (Block 134). The build platform 106 and the window are then in plane-to-plane contact and the build platform 106 is urged into alignment. Alternatively, the build platform 106 may be brought into contact with a fixture or frame member rather than the window (e.g., to avoid damage to the build surface or window). For example, the frame member may be disposed around the window and may have an upper (contact) surface that is parallel to the window. Either way, the contact causes the build platform 106 to be aligned with a bottom surface of the build platform 106 parallel to the window. The aligned build platform 106 is then locked into place by pressurizing the lock mechanisms as described above.

The aligned build platform 106 may then be advanced away from the window (Block 136). As illustrated in FIG. 6B, a 3D object may be adhered to the build platform 106 as the build platform 106 is raised away from the window (or a 3D object may be on a build layer that is held on the build platform 106 as described in more detail below). After the fully fabricated 3D object is removed from the build platform 106, the steps illustrated in Blocks 132-136 may be repeated. In this regard, the build platform 106 may be aligned on a per-print basis.

According to some embodiments, the aligned build platform is first advanced away from the window and then stopped so that a build region is defined between the build platform and the window. The build region is filled with resin which is irradiated through the window and the aligned build platform is then further advanced away from the window to form the 3D object.

Referring to FIGS. 2, 7 and 8, a build layer member 140 is held on the build platform 106. The build layer 140 may be a plastic and/or relatively inexpensive member and may be disposable (e.g., single-use disposable).

The build layer 140 is held to the build platform 106 by vacuum. A plurality of vacuum ports 142 are defined in the build platform (one of the vacuum ports 142 is shown in FIG. 7). The vacuum ports 142 are in fluid communication with a vacuum pump. The vacuum ports 142 are also in fluid communication plurality of grooves 144 formed in the underside of the build platform 106. As illustrated, the grooves 144 may be disposed in a grid-like pattern. The grooves 144 allow the vacuum pressure to be distributed evenly to help ensure that the build layer 140 is firmly adhered to the build platform 106.

A gasket or seal 146 is provided around the perimeter of the build platform 106 to contain the vacuum. The build layer member 140 includes an aperture 148 on opposite sides thereof; the apertures 148 are configured to receive mechanical hook members 150 on opposite sides of the build platform. The hooks 150 hold the build layer 140 on the build platform 106 when the vacuum is off. Instead of the apertures 148, there could be cups or pockets defined in the build layer member 140 that are shaped and configured to (conformally) receive the hooks. This configuration may help prevent the ingress and egress of fluid such as resin.

It is contemplated that the build layer member 140 may be attached to the build platform 106 in other ways. For example, the build layer member 140 may be ferrous and be attached to the build platform by magnetic force.

According to some embodiments, the build platform 106 includes one or more resin feed ports 152 defined therethrough. The build layer member 140 may also include one or more resin feed ports 154 that are positioned to align with the build platform feed ports 152 when the build layer 140 is positioned on the build platform 106. The aligned feed ports 152, 154 are configured to receive resin therethrough which is then delivered to the window (or the area above the window). The feed ports may be used to deliver one type of resin to the window or may be used to deliver a plurality of different types of resin to the window (e.g., concurrently or sequentially).

The build platform 106 and/or the build layer 140 may include one or more gaskets or seals 156, 158 to provide a seal for resin flowing through the feed ports 152, 154. For example, the build platform 106 may include the seals 156 and the build layer 140 may include the seals 158. Corresponding ones of the seals 156, 158 may cooperate to form the seal for the resin flowing through the feed ports 152, 154 (e.g., to prevent the resin from flowing into the vacuum groove grid described above).

Figure 9:
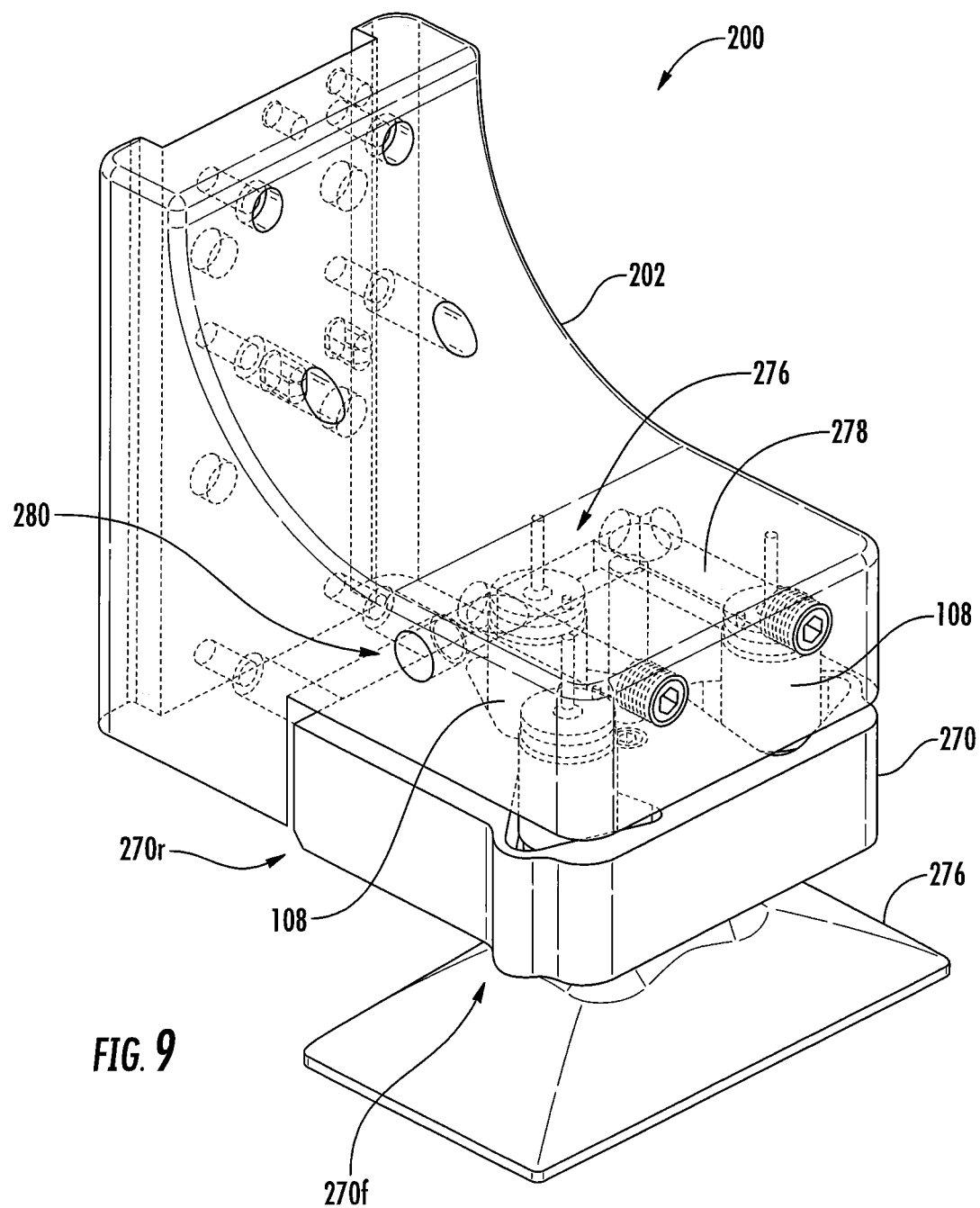
FIG. 9 is a partially transparent perspective view of a carrier assembly according to some other embodiments.

A build platform assembly or carrier assembly 200 according to some other embodiments is illustrated in FIG. 9. The assembly 200 includes an upper support 202 that is integrated with or configured to couple to a linear stage as described above in reference to the build platform assembly 100.

The build platform assembly 200 also includes a movable platform 270. Between the upper support 202 and the movable platform 270 are a plurality of lock or locking mechanisms 108. As illustrated, there are two lock mechanisms 108 at a front portion 270f of the movable platform 270 and one lock mechanism at a rear portion 270r of the movable platform 270.

The lock mechanisms 108 may be as described above in reference to FIGS. 3 and 4. Specifically, a respective lock mechanism 108 may include the hydraulic work support 112 and/or one or more of the flexures 114 as described above.

Figure 10:
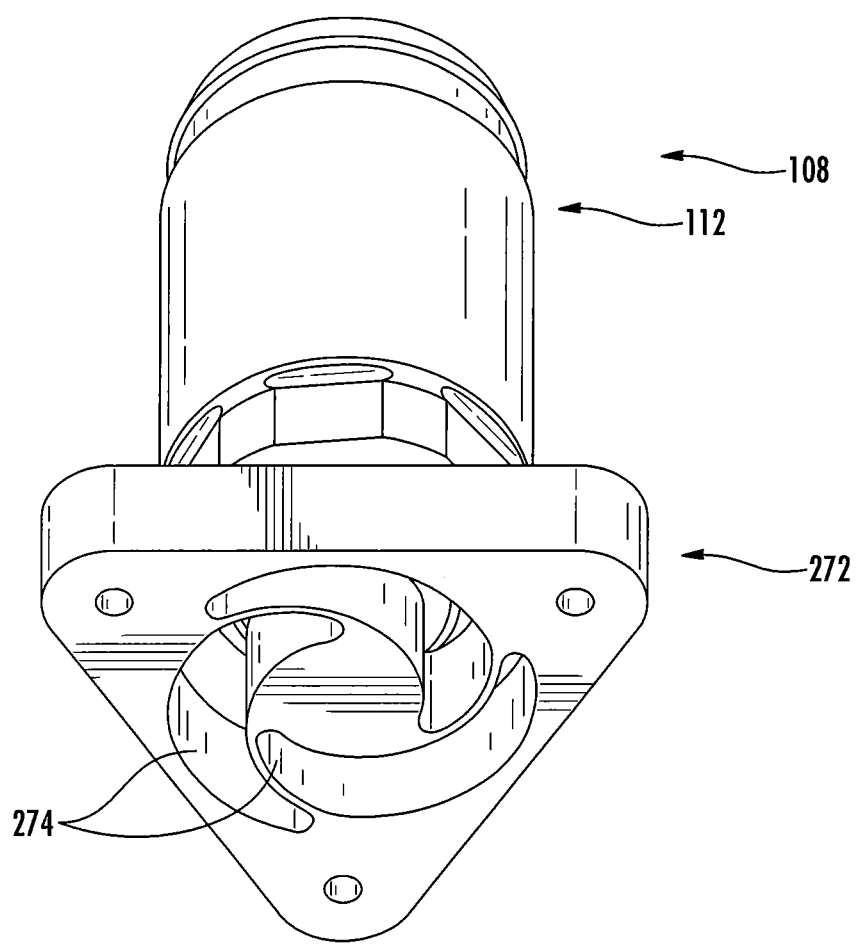
FIG. 10 is a perspective view of a locking mechanism and flexure of the carrier assembly of FIG. 9.

Referring to FIGS. 9 and 10, a lower flexure member 272 is at a lower portion of the locking mechanism 108 (or the work support 112). The flexures 272 couple the locking mechanisms 108 (or the work supports 112) and the movable platform 270. The flexure 272 includes a plurality of openings 274 defined therein in a spiral pattern. The flexure 272 with this spiral design is configured to be compliant in tilting while also being stiff in the axial direction.

Although the build platform assembly 200 illustrated in FIG. 9 shows a simplified build platform 276, the build platform 106 described above may be used in place of the build platform 276. In addition, the build layer member 140 may be held on the build platform 106 as described above.

Similar to the build platform 106 described above in reference to the embodiment illustrated in FIG. 2, the movable platform 270 is configured to "float" in an unlocked state (e.g., when hydraulic pressure is not applied to the work supports 112) and lock tightly in a locked state (e.g., when hydraulic pressure is applied to the work supports 112). The build platform 106 may be fixedly (e.g., rigidly) coupled to the movable platform 270. Therefore, the build platform 106 may be configured to "float" in the unlocked state and lock tightly in the locked state to provide the advantageous alignment capabilities described above in reference to FIGS. 6A and 6B.

As illustrated in FIG. 9, the upper support 202 includes an integral hydraulic manifold 276 including channels 278 through which hydraulic pressure can be communicated to the lock mechanisms 108 (or the work supports 112). A hydraulic pressure port 280 may be in communication with a hydraulic pressure source so that each of the work supports 112 can be pressurized to selectively lock the movable platform 270 and/or the build platform 206.

Figure 11:
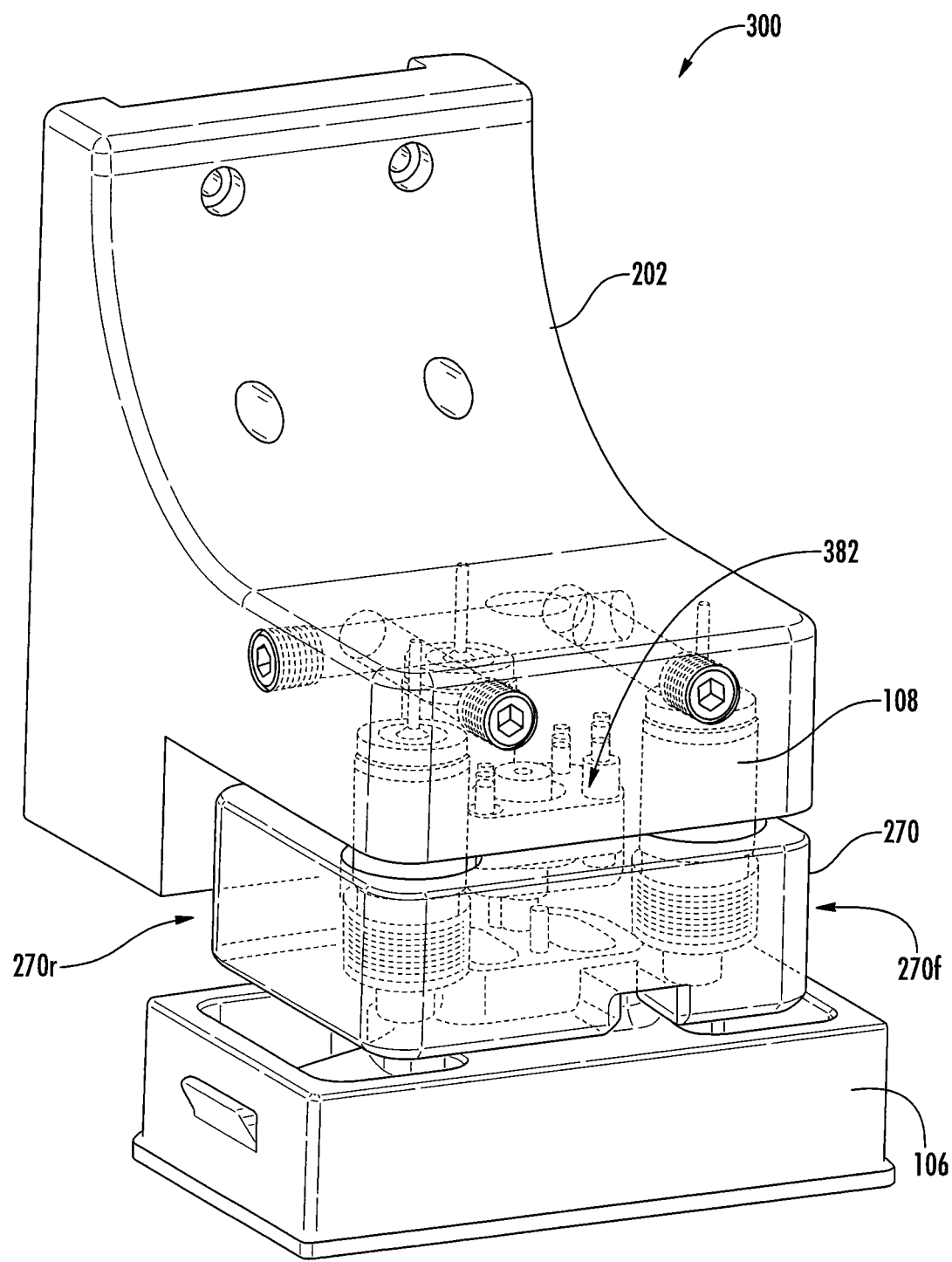
FIG. 11 is a partially transparent perspective view of a carrier assembly according to some embodiments.

A build platform assembly or carrier assembly 300 according to some other embodiments is illustrated in FIG. 11. The assembly 300 includes an upper support 202 that is the same or similar to the upper support 202 described above.

The build platform assembly 300 also includes a movable platform 270 that is the same or similar to the movable platform 270 described above. Between the upper support 202 and the movable platform 270 are a plurality of lock or locking mechanisms 108. As illustrated, there are two lock mechanisms 108 at a front portion 270f of the movable platform 270 and one lock mechanism at a rear portion 270r of the movable platform 270.

The lock mechanisms 108 may be as described above in reference to FIGS. 3 and 4. Specifically, a respective lock mechanism 108 may include the hydraulic work support 112 and/or one or more of the flexures 114 as described above.

A spherical bearing 382 is positioned between the lock mechanisms 108. The spherical bearing 382 is configured to support the movable platform 270.

Figure 12:
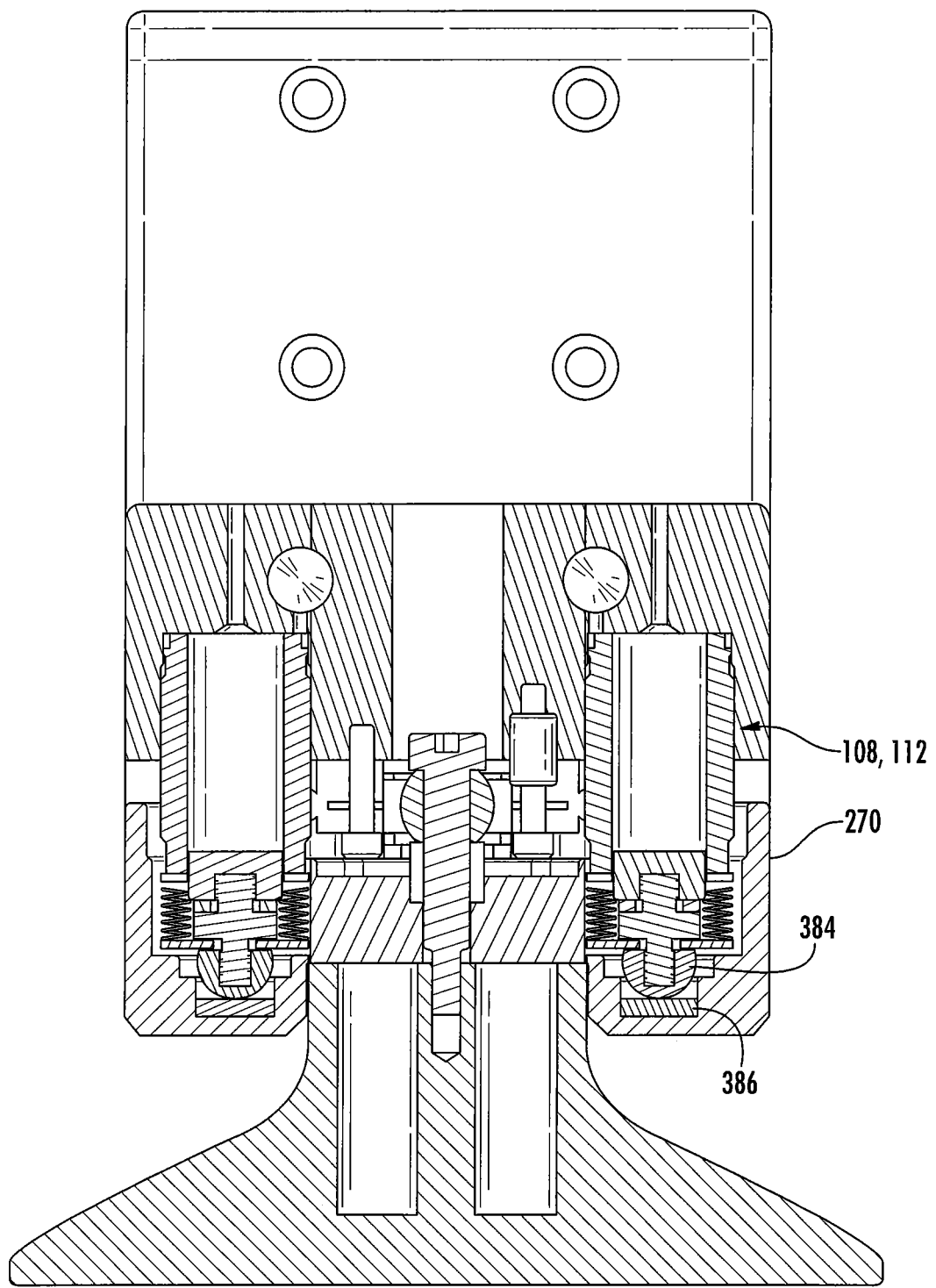
FIG. 12 is a sectional view of the carrier assembly of FIG. 11.

Referring to FIG. 12, a hardened ball member 384 is coupled to each locking mechanism 108 (or work support 112) at the movable platform front portion 270f and contacts a plate 386 on the movable platform 270. The balls 384 that bear on the plates 386 provide only axial constraint. The arrangement with the spherical bearing 382, the balls 384 and the plates 386 isolates the work supports 112 from side loading as the work supports 112 are only pushing down in one direction to stabilize the structure.

Figure 13:
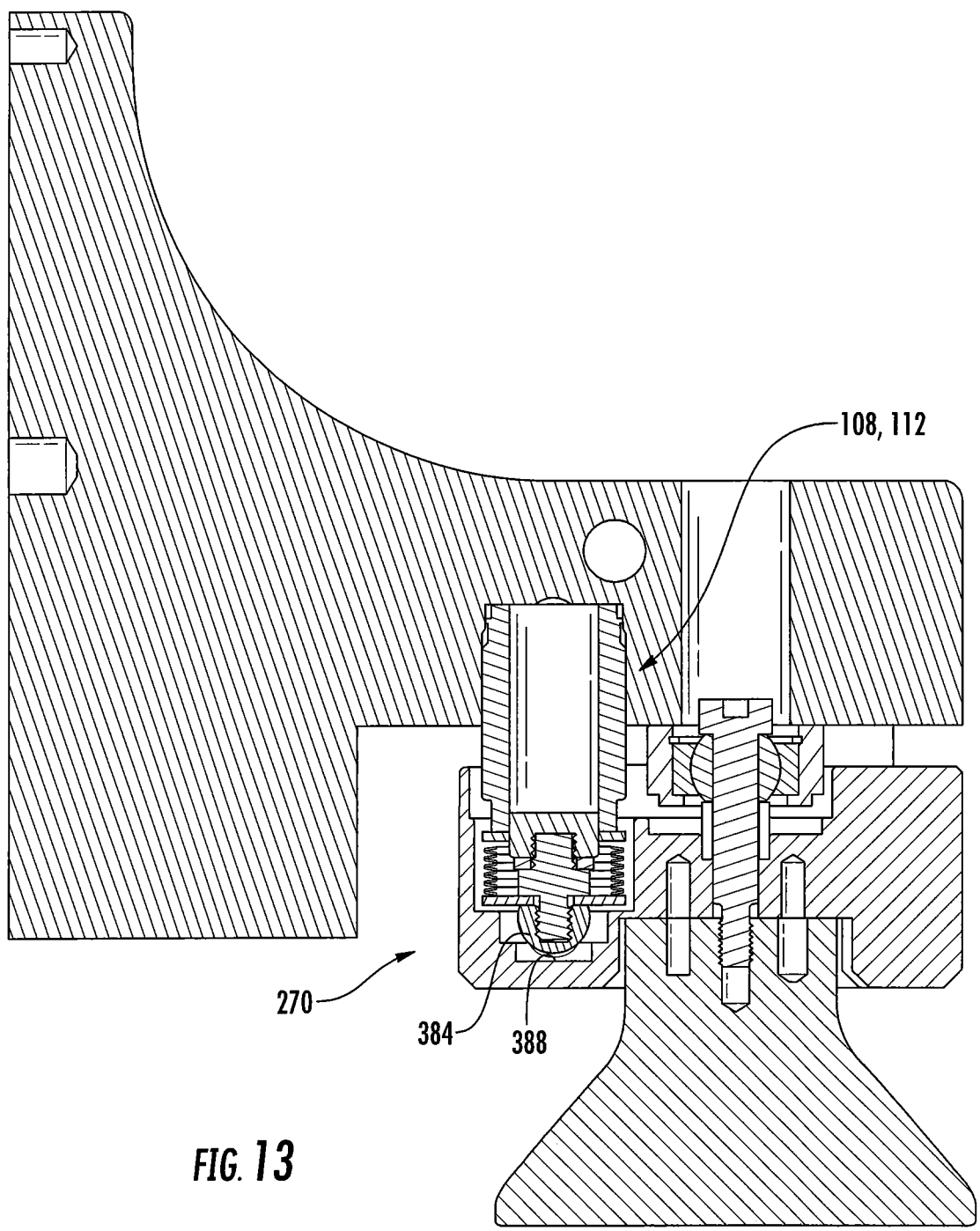
FIG. 13 is another sectional view of the carrier assembly of FIG. 11.

Referring to FIG. 13, a ball member 384 is coupled to the locking mechanism 108 (or work support 112) at the movable platform rear portion 270r. The ball 384 rides in a groove 388, providing axial constraint and also limiting travel along the direction mutually perpendicular to both the axis of the work support 112 and the groove 388.

FIG. 10 illustrates the build platform 106 which may be fixedly (e.g., rigidly) coupled to the movable platform 270. In this regard, the build platform 106 may be configured to "float" in the unlocked state and lock tightly in the locked state to provide the advantageous alignment capabilities described above in reference to FIGS. 6A and 6B.

It is contemplated that only two work supports could be employed with another alignment feature. It is also contemplated that more than three work supports could be employed which may provide better load distribution.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A method for forming a three-dimensional object, the method comprising:
   providing a three-dimensional printer comprising a build surface and a carrier that is movable away from and toward the build surface;
   placing the carrier in an unlocked state;
   advancing the carrier toward the build surface with the carrier in the unlocked state and contacting a lower surface of the carrier with the build surface or a fixture or frame member adjacent the build surface to align the carrier in an aligned position with the lower surface of the carrier parallel to the build surface;
   locking the carrier in a locked state to maintain the carrier in the aligned position; and
   advancing the carrier away from the build surface with the three-dimensional object adhered to the carrier,
   wherein the carrier is configured to rotate in pitch and roll while being prevented from moving in other degrees of freedom when the carrier is in the unlocked state.

2. The method of claim 1 wherein the carrier comprises a plurality of locking mechanisms, and wherein locking the carrier comprises locking the plurality of locking mechanisms.

3. The method of claim 2 wherein the plurality of locking mechanisms comprise a plurality of hydraulic work supports, and wherein locking the carrier comprises applying hydraulic pressure to each of the hydraulic work supports.

4. The method of claim 3, wherein the carrier comprises an internal manifold configured to communicate the hydraulic pressure to the plurality of hydraulic work supports.

5. The method of claim 3 wherein the plurality of hydraulic work supports comprise first and second hydraulic work supports at a front portion of the carrier and a third hydraulic work support at a rear portion of the carrier.

6. The method of claim 5 wherein the carrier comprises a spherical bearing between the first, second and third hydraulic work supports.

7. The method of claim 3 wherein the plurality of hydraulic work supports comprise first and second hydraulic work supports at a front portion of the carrier, and wherein the carrier comprises a flexure member at a rear portion of the carrier.

8. The method of claim 3 wherein the carrier is configured to be in the unlocked state by unlocking the plurality of locking mechanisms, and wherein hydraulic pressure is not applied to the hydraulic work supports when the carrier is in the unlocked state.

9. The method of claim 1 wherein the build surface is defined by an optically transparent member, the method further comprising, after the locking step:
    advancing the carrier away from the build surface with the carrier in the locked state such that a build region is defined between the carrier and the build surface;
    filling the build region with a polymerizable liquid;
    irradiating the build region with light through the optically transparent member to form a solid polymer from the polymerizable liquid; and
    advancing the carrier away from the build surface to form the three-dimensional object from the solid polymer.

10. The method of claim 9 wherein a build layer member is on the lower surface of the carrier, the method further comprising adhering the build layer member to the carrier by applying vacuum through one or more vacuum ports defined in the carrier.

11. The method of claim 10 wherein a plurality of grooves are defined in a grid pattern in the lower surface of the carrier with the grooves in fluid communication with the one or more vacuum ports.

12. The method of claim 10 wherein the build layer member comprises a primary surface that is held on the lower surface of the carrier and first and second opposite side surfaces that extend upwardly away from the primary surface, each of the first and second side surfaces having an aperture or pocket defined therein that is configured to receive a hook member of the carrier to retain the build layer member on the carrier when vacuum is not applied.

13. The method of claim 10 wherein the build layer member is plastic and/or single-use disposable.

14. The method of claim 9, wherein the filling, irradiating and/or advancing steps are carried out while also concurrently:
    (i) continuously maintaining a dead zone of polymerizable liquid in contact with the build surface, and
    (ii) continuously maintaining a gradient of polymerization zone between the dead zone and the solid polymer and in contact with each thereof, the gradient of polymerization zone comprising the polymerizable liquid in partially cured form.

15. The method of claim 14, wherein the optically transparent member comprises a semipermeable member, and the continuously maintaining a dead zone is carried out by feeding an inhibitor of polymerization through the optically transparent member in an amount sufficient to maintain the dead zone and the gradient of polymerization zone.

16. A method for forming a three-dimensional object, the method comprising:
    providing a three-dimensional printer comprising a build surface and a carrier that is movable away from and toward the build surface;
    advancing the carrier toward the build surface and contacting a lower surface of the carrier with the build surface or a fixture or frame member adjacent the build surface to align the carrier in an aligned position with the lower surface of the carrier parallel to the build surface;
    locking the carrier in a locked state to maintain the carrier in the aligned position; and
    advancing the carrier away from the build surface with the three-dimensional object adhered to the carrier,
    wherein the build surface is defined by an optically transparent member, the method further comprising, after the locking step:
        advancing the carrier away from the build surface with the carrier in the locked state such that a build region is defined between the carrier and the build surface;
        filling the build region with a polymerizable liquid;
        irradiating the build region with light through the optically transparent member to form a solid polymer from the polymerizable liquid; and
        advancing the carrier away from the build surface to form the three-dimensional object from the solid polymer,
    wherein a build layer member is on the lower surface of the carrier, the method further comprising adhering the build layer member to the carrier by applying vacuum through one or more vacuum ports defined in the carrier,
    wherein the carrier and/or the build layer member includes at least one feed channel defined therethrough, and wherein the filling step comprises feeding the polymerizable liquid through the at least one feed channel to the build region.

17. The method of claim 16 wherein the carrier is configured to be in an unlocked state.

18. The method of claim 17 wherein the carrier is configured to rotate in pitch and roll while being prevented from moving in other degrees of freedom when the carrier is in the unlocked state.

19. The method of claim 18 wherein advancing the carrier toward the build surface comprises advancing the carrier toward the build surface with the carrier in the unlocked state.

20. A method for forming a three-dimensional object, the method comprising:
    providing a three-dimensional printer comprising a build surface and a carrier that is movable away from and toward the build surface;
    placing the carrier in an unlocked state wherein the carrier is configured to rotate in pitch and roll;
    advancing the carrier toward the build surface with the carrier in the unlocked state and contacting a lower surface of the carrier with the build surface or a fixture or frame member adjacent the build surface to align the carrier in an aligned position with the lower surface of the carrier parallel to the build surface;
    locking the carrier in a locked state to maintain the carrier in the aligned position; and
    advancing the carrier away from the build surface with the three-dimensional object adhered to the carrier,
    wherein the build surface is defined by an optically transparent member, the method further comprising, after the locking step:
        advancing the carrier away from the build surface with the carrier in the locked state such that a build region is defined between the carrier and the build surface;
        filling the build region with a polymerizable liquid;
        irradiating the build region with light through the optically transparent member to form a solid polymer from the polymerizable liquid; and
        advancing the carrier away from the build surface to form the three-dimensional object from the solid polymer,
    wherein the carrier includes at least one feed channel defined therethrough, and wherein the filling step comprises feeding the polymerizable liquid through the at least one feed channel to the build region.

* * * * *